United States Patent
Blackburn

(12)
(10) Patent No.: US 6,479,782 B1
(45) Date of Patent: Nov. 12, 2002

(54) FABRICATION OF A BRAZELESS CROSS-BLADE FLEXURE BLOCK

(75) Inventor: John P. Blackburn, Rio Rancho, NM (US)

(73) Assignee: Goodrich Corporation, Charlotte, NC (US)

( * ) Notice: Subject to any disclaimer, the term of this patent is extended or adjusted under 35 U.S.C. 154(b) by 161 days.

(21) Appl. No.: 09/636,395

(22) Filed: Aug. 9, 2000

(51) Int. Cl.[7] .................................................. B23H 1/00
(52) U.S. Cl. ...................................... 219/69.17; 29/434
(58) Field of Search ...................... 219/69.17; 359/223, 359/224, 290, 291, 872, 874; 29/434, 437, 438; 83/177

(56) References Cited

U.S. PATENT DOCUMENTS 3,700,290 A * 10/1972 Ensinger
3,811,172 A * 5/1974 Bilinski et al.
4,019,391 A * 4/1977 Ljung
4,207,668 A * 6/1980 Previte
4,269,072 A * 5/1981 Duncan
4,701,037 A * 10/1987 Bramer
5,268,784 A * 12/1993 Chaya .......................... 359/224
5,486,917 A * 1/1996 Carangelo et al.
5,488,761 A * 2/1996 Leone
5,703,683 A * 12/1997 Hunt et al.

* cited by examiner

Primary Examiner—Geoffrey S. Evans
(74) Attorney, Agent, or Firm—James M. Rashid; Calfee, Halter & Griswold LLP

(57) ABSTRACT

A cross-blade flexure block is prepared by machining a first cross-blade flexure element and a second cross-blade flexure element. Machining is accomplished by a technique such as electrical discharge machining or water jet machining. Each cross-blade flexure element is a single integral piece, with no braze joints therein. The first cross-blade flexure element and the second cross-blade flexure element are assembled together to form a flexure block.

14 Claims, 2 Drawing Sheets

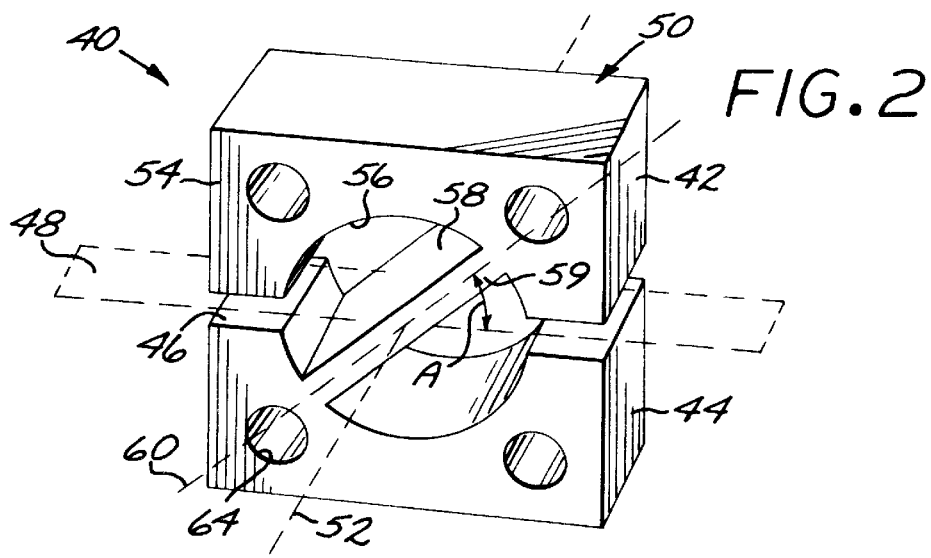
FIG. 2
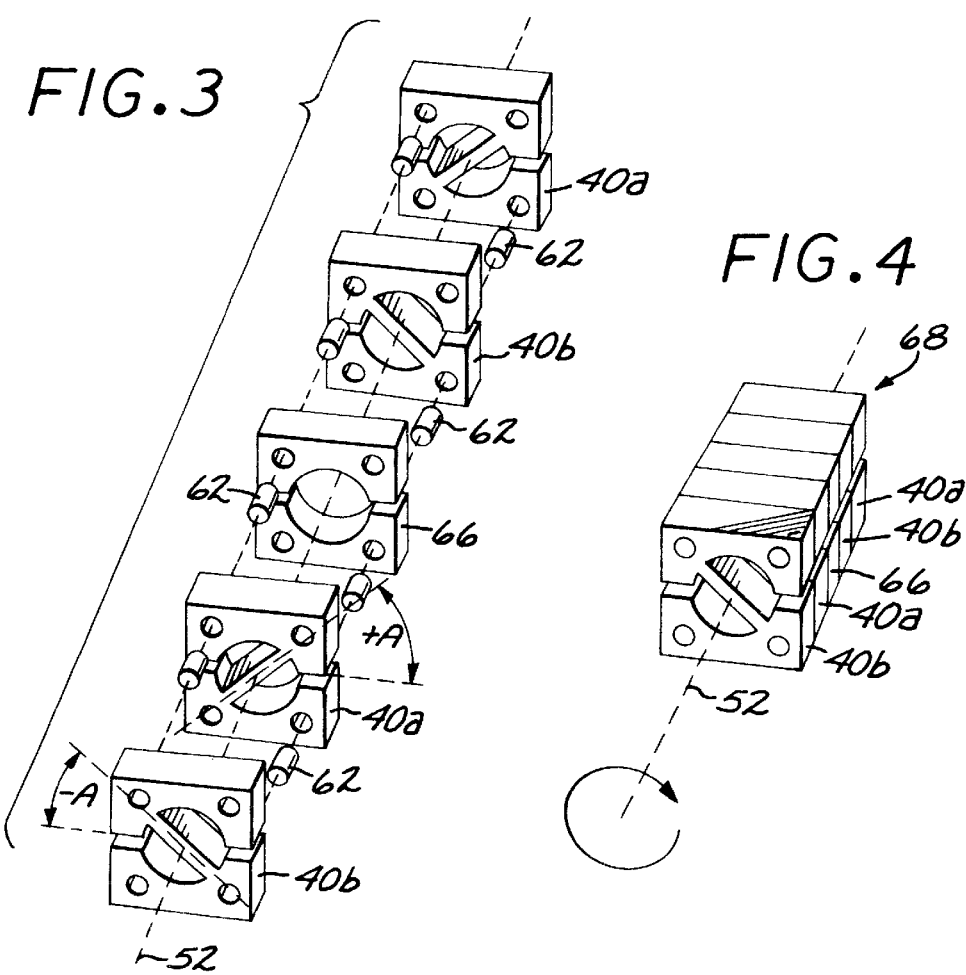
FIG. 3
FIG. 4

FABRICATION OF A BRAZELESS CROSS-BLADE FLEXURE BLOCK

This invention was made with government support under contract No. N00024-98-C-5362 awarded by the Department of the Navy. The government has certain rights in this invention.

This invention relates to cross-blade flexures, and, more particularly, to the fabrication of a cross-blade flexure block whose stiffness properties and deflection symmetry are highly regular and predictable.

BACKGROUND OF THE INVENTION

A cross-blade flexure block is a known device which acts as a torsional spring. It provides a well-defined torsional response about its housing axis and is desirably resistant to deflection about other axes. The cross-blade flexure block provides this response in a compact size, so that it is particularly useful in cases where the entire structure is constrained to lie within a small volume.

An example of an application is a mirror mount of a beam-steering mirror. Two of the cross-blade flexure blocks are mounted with their housing axes in the plane of the mirror surface and orthogonal to each other. Drive motors deflect the mirror about the axes, and the cross-blade flexure blocks provide a measured restraint to the deflection and a restoring force to the null position.

For this and other applications, the angular deflection as a function of the applied torque must be very precisely known and predictable. Because of the complexity of the geometry of the cross-blade flexure block, the conventional practice is to design the configuration of the cross-blade flexure block using finite element design techniques. The angular deflection as a function of force is simulated for varying geometries and materials of construction. When the desired characteristics have been achieved, the geometry is transferred to the final drawings.

To build each cross-blade flexure element from which the cross-blade flexure block is assembled, the two halves of the housing of the cross-blade flexure element and the flexing blade are machined. The two halves are then joined by brazing one end of the blade to each of the housing halves in the proper geometry. A number of the cross-blade flexure elements are assembled together to form the cross-blade flexure block.

Upon testing, it is found that many of the individual cross-blade flexure elements do not conform to the predictions of the analytical procedure of angular deflection as a function of applied torque. In small-scale, speciality applications, the user is often forced to use the nonconforming cross-blade flexure block. In mass production circumstances, the nonconforming cross-blade flexure elements are discarded, and only the conforming cross-blade flexure elements are assembled into the final cross-blade flexure block. The cost of each cross-blade flexure block is therefore quite high, because of the low production yields. No approach has been suggested to improve the ability to produce cross-blade flexure blocks that more closely conform to the predicted properties, or to improve yields to achieve lower total production costs.

There is a need for an improved approach to the production of cross-blade flexure blocks, which achieves acceptable, predictable performance with lower total production costs. The present invention fulfills this need, and further provides related advantages.

SUMMARY OF THE INVENTION

The present invention provides an improved approach to the production of cross-blade flexure elements, and thence cross-blade flexure blocks. The stiffness properties and deflection symmetry of the cross-blade flexure blocks are highly regular and predictable by available design procedures. The cross-blade flexure blocks have acceptable performance at a cost that is on the order of one-sixth that of cross-blade flexure blocks made by the conventional approach. The production techniques used in the present approach are widely available, as distinct from the narrower availability of the production techniques used in other approaches.

In accordance with the invention, a method of fabricating a cross-blade flexure block comprises the steps of furnishing a first plate of a flexure material, and machining a first cross-blade flexure element from the first plate as a first single piece of material. The method further includes furnishing a second plate of the flexure material, and machining a second cross-blade flexure element from the second plate as a second single piece of material. (The first plate and the second plate may be the same plate or different plates, but they are of the same nominal material.) The first cross-blade flexure element and the second cross-blade flexure element are assembled together to form a flexure block. In the assembly, locating pins may be positioned between the first cross-blade flexure element and the second cross-blade flexure element.

In a preferred case, each of the cross-blade flexure elements comprises an upper blade housing, and a lower blade housing positioned with respect to the upper blade housing such that there is a planar slot between the upper blade housing and the lower blade housing and lying in a slot plane. The upper blade housing and the lower blade housing are shaped to define an external form factor symmetric about a housing axis (which is the torque axis in service) and a bore therethrough symmetric about the housing axis. A blade extends transversely through the bore between the upper housing and the lower housing and intercepts the housing axis. The blade has a blade angle of from more than 0 to less than 90 degrees relative to the slot plane. Usually, the blade angle is about 45 degrees. Preferably, the first cross-blade flexure element and the second cross-blade flexure element have the same shape, except that the blade angle of the first cross-blade flexure element is +A, and the blade angle of the second cross-blade flexure element is −A, relative to the slot plane.

Because of the complexity of this structure and its small size for most applications, it has been conventional practice to machine the two blade housings and the blade as separate components and then join them by brazing. The inventor has discovered that the variability observed in the final products results from variations in this production process, particularly the variations resulting from the brazing operation. Although it is widely and successfully used in many applications, brazing is simply not a sufficiently well-controlled process to produce the very exact properties needed in the final structure of the cross-blade flexure elements and assembled blocks.

The inventor has therefore determined to design the cross-blade flexure elements using finite-element analysis. The cross-blade flexure elements are fabricated as a single piece using an appropriate machining technique such as electrical discharge machining (EDM) or high-pressure water-jet machining, guided by numerical-control parameters established in the finite-element analysis. Eliminating the three-piece structure of the conventional cross-blade flexure element, and particularly the brazing operation used to join the three pieces together, has resulted in much less variability of properties and better predictability of properties. The manufacturing yield of the cross-blade flexure elements is therefore much greater than achieved by conventional manufacturing techniques, and the total and per-finished-part manufacturing costs are reduced substantially. Initial studies indicate that the costs in the present approach are reduced to one-sixth or less of the costs of conventionally produced cross-blade flexure blocks.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 2 is a perspective view of a cross-blade flexure element;

FIG. 3 is a perspective exploded view of a cross-blade flexure block showing the mode of assembly; and FIG. 4 is a perspective view of an assembled cross-blade flexure block.

DETAILED DESCRIPTION OF THE INVENTION

Figure 1:
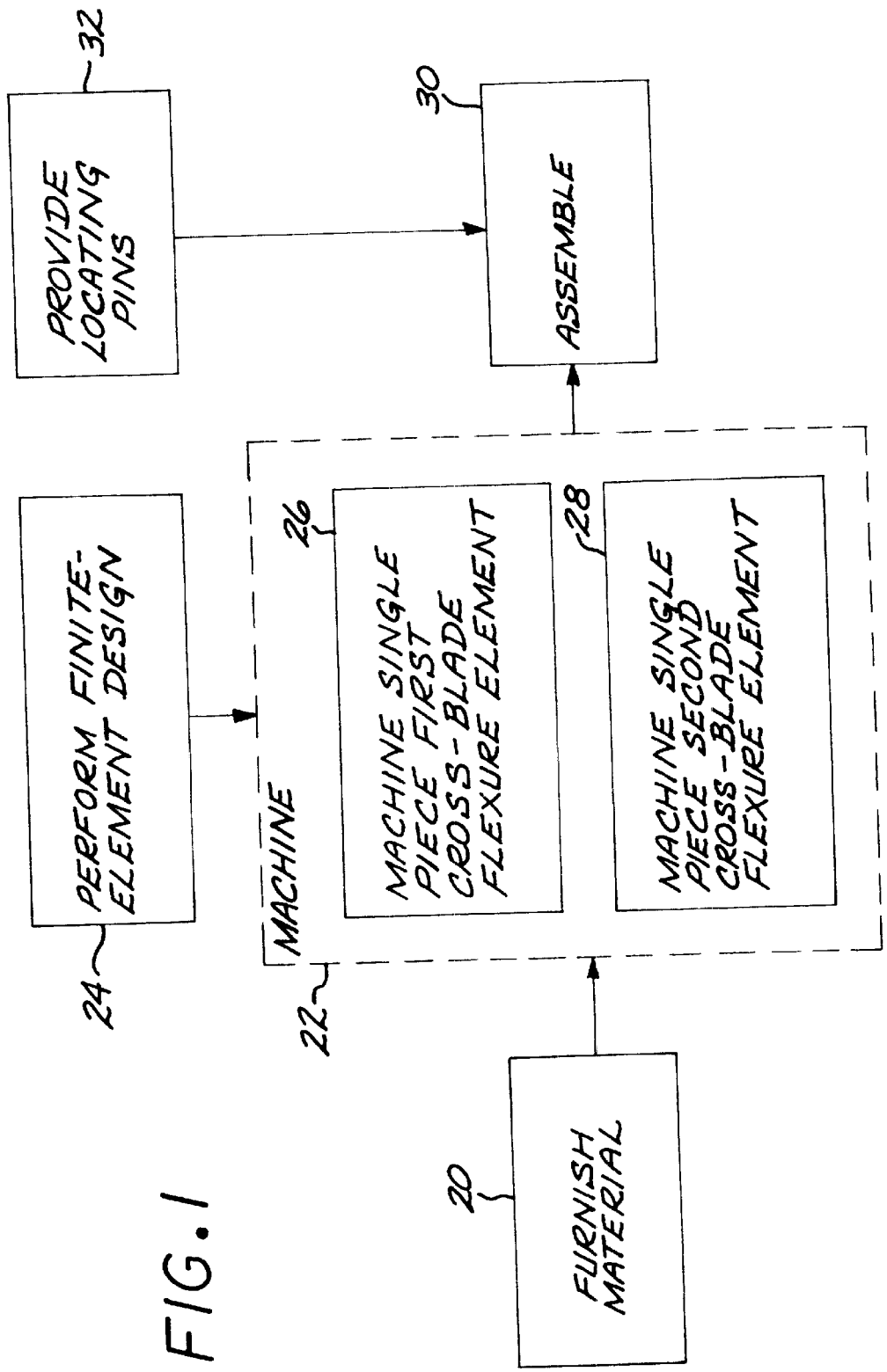
FIG. 1 is a block flow diagram for the fabrication of a cross-blade flexure block.

FIG. 1 summarizes, in block diagram form, a preferred approach for practicing the invention. The material for producing the cross-blade flexure elements is furnished, numeral 20. Most preferably, each of the cross-blade flexure elements is made of the same flexure material. The flexure material is typically made of a titanium alloy material of construction such as an alloy having a nominal composition, in weight percent, of 5.5–6.5 percent aluminum, 0.08 percent carbon, 0.015 percent hydrogen, 0.25 percent iron, 0.13 percent oxygen, and 3.5–4.5 percent vanadium, balance titanium and impurities (usually termed Ti-6Al-4V). The selection of the material of construction determines the materials properties of the cross-blade flexure elements and thence the final assembled cross-blade flexure block. The flexure material of construction is furnished in plate form, having a thickness that defines the thickness of the cross-blade flexure elements. That thickness may be any selected value. In a typical case, the thickness is about 0.313 inches.

The cross-blade flexure elements are machined from the plates of the flexure material, numeral 22. The cross-blade flexure elements are first designed, numeral 24, to provide specific deformation characteristics. The preferred design approach is finite-element analysis. Finite-element analysis of elastically deforming articles using computer-based design techniques is well known, and analysis programs are commercially available. A preferred finite-element analysis program is NASTRAN, available from MSC.software Corp., Los Angeles, Calif.

FIG. 2 shows a preferred form of a cross-blade flexure element 40. Each of the cross-blade flexure elements 40 comprises an upper blade housing 42 and a lower blade housing 44. The lower blade housing 44 is positioned with respect to the upper blade housing 42 such that there is a planar slot 46 between the upper blade housing 42 and the lower blade housing 44. The planar slot 46 defines and lies in a slot plane 48. The upper blade housing 42 and the lower blade housing 44 are shaped to define an external form factor 50, which in this case is a square, but which may be any operable shape such as a circle, polygon, and the like. The external form factor 50 is symmetric about a housing axis 52. A face 54 of the cross-blade flexure element 40 lies perpendicular to the housing axis 52. A bore 56 extends parallel to the housing axis 52 and is symmetric about the housing axis 52.

A blade 58 extends transversely through the bore 56 between the upper housing 42 and the lower housing 44. The blade is a piece of metal of the same material as the upper housing 42 and the lower housing 44 and is continuous and integral with the upper housing 42 and the lower housing 44. That is, in the present approach the blade 58 may not be fabricated separately from the upper housing 42 and the lower housing 44 and then joined to the upper housing 42 and the lower housing 44 by some joining technique such as brazing. In the present approach, the blade is not brazed to the upper housing 42 and to the lower housing 44, and there is no brazing operation carried out in the present fabrication process.

The blade 58 having an edge 59 intercepts the housing axis 52. The blade has a planar blade centerplane 60, and the housing axis 52 lies in the planar blade centerplane 60. The centerplane 60, and thence the blade 58, makes a blade angle A relative to the slot plane 48. The blade angle A is from more than 0 to less than 90 degrees relative to the slot plane 48. The blade angle A is preferably equal to about 45 degrees to the slot plane 48.

For use in preparing a cross-blade flexure block, matched pairs of the cross-blade flexure elements 40 are prepared. The cross-blade flexure elements of these pairs are identical, except that in one of the elements the blade angle is +A and in the other of the elements the blade angle is −A, relative to the slot plane 48. In a preferred embodiment, the blade angle in one of the cross-blade flexure elements is +45 degrees, and the blade angle in the other of the cross-blade flexure elements is −45 degrees. That is, in the machining step 22, a single-piece first cross-blade flexure element having a blade angle of +A is machined, numeral 26, and an otherwise identical single-piece second cross-blade flexure element having a blade angle of −A is machined, numeral 28.

In a typical case, the cross-blade flexure elements 40 are moderately small. For example, the length of a side of the square of the external form factor 50 is about 1.0 inch, the slot 46 is about 0.063 inch wide, the blade 58 is about 0.119 inch thick, and the cross-blade flexure is about 0.313 inch thick. The front and back edge 59 of the blade 58 may optionally be recessed slightly from the respective faces 54, typically about 0.025 inch.

Because of these small dimensions, it is quite difficult to machine the cross-blade flexure elements 40 from a single piece of metal using conventional techniques in step 22. The machining is therefore accomplished with a technique such as electrical discharge machining (EDM) or high-pressure water-jet machining. In EDM, a voltage is applied between a wire or other type of machining element and the workpiece through a fluid. Metal is removed from the workpiece to accomplish the machining. In high-pressure waterjet machining, a high pressure water jet accomplishes the cutting. In each case, no bulky mechanical cutting tool must be inserted into the slot 46 or the D-shaped openings defined between the blade 58 and the housings 42 and 44. They are therefore suitable for machining articles such as the cross-blade flexure element 40. Of these techniques, EDM is preferred.

After the cross-blade flexure elements 40 are machined in step 22, they are assembled in step 30. FIG. 3 is an exploded assembly drawing. To accomplish the assembly, pairs of the cross-blade flexure elements 40 are placed in face-to-face relation. Locating pins 62 are provided, numeral 32, and inserted into locating-pin holes 64 that are machined perpendicular to the face 54 of each of the cross-blade flexure elements and thence parallel to the housing axis 52. As shown, paired cross-blade flexure elements 40*a* and 40*b*, one with a blade angle of +A and the other with a blade angle of −A, are assembled together in this fashion. Two locating pins 62 are typically required between each pair of cross-blade flexure elements. The locating pins 62 may be held in place in the holes 64 with a small amount of an adhesive if desired to prevent loosening during service.

For some applications, it is sufficient to use one pair of the cross-blade flexure elements 40*a* and 40*b*. For other applications, more rotational deflection is provided by placing more than one pair 40*a*, 40*b* axially along the housing axis 52. In FIG. 3, two pairs 40*a*, 40*b* of the cross-blade flexure elements are used, with a spacer block 66 between the pairs. The spacer block 66 is geometrically the same as the cross-blade flexure element 40, except that it has no blade 58.

FIG. 4 depicts the completed assembly of a cross-blade flexure block 68, formed by collapsing the exploded form of FIG. 3 along the housing axis 52. The housing axis 52 serves as the torque axis of the cross-blade flexure block 68 in service, providing a controlled torsional deflection as a function of load applied about the torque axis. The cross-blade flexure block 68 is highly rigid against torque applied to axes lying perpendicular to the torque axis (housing axis 52).

In prior fabrication approaches, the housings and blade of the cross-blade flexure element were made as separate pieces and brazed or otherwise joined together. The manufacturing variability introduced by this technique resulted in a large fraction of the assembled cross-blade flexure elements being unsuitable for use. In the present approach, once the design parameters have been established in step 24, the design parameters are provided to a numerically controlled machining system in step 22. All of the cross-blade flexure elements 40 made to these design parameters are substantially identical within machine tolerances, except for the blade angle being +A and −A to define the pairs 40*a* and 40*b*. The result is greatly reduced variability in the cross-blade flexure elements, so that the manufacturing yield is high. The resulting total cost and the cost per part are therefore greatly reduced as compared with the conventional approach. These results are quite surprising and unexpected, as it had not been heretofore appreciated that the brazing variation was sufficiently great to produce the unacceptable variation in the final parts.

Prototypes of cross-blade flexure blocks produced by the present approach have been prepared and tested. They have acceptable properties at reduced cost.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of fabricating a cross-blade flexure block, comprising the steps of:
   furnishing a first plate of a flexure material;
   machining a first cross-blade flexure element from the first plate as a first single piece of material;
   furnishing a second plate of the flexure material;
   machining a second cross-blade flexure element from the second plate as a second single piece of material;
   wherein each of the cross-blade flexure elements comprises:
      an upper blade housing;
      a lower blade housing positioned with respect to the upper blade housing such that there is a planar slot between the upper blade housing and the lower blade housing and lying in a slot plane, the upper blade housing and the lower blade housing being shaped to define an external form factor symmetric about a housing axis and a bore therethrough symmetric about the housing axis; and
      a blade extending transversely through the bore between the upper housing and the lower housing and intercepting the housing axis, the blade having a blade angle of from more than 0 to less than 90 degrees relative to the slot plane; and
   assembling the first cross-blade flexure element and the second cross-blade flexure element together to form a flexure block.

2. The method of claim 1, wherein the step of assembling includes the step of
   positioning locating pins between the first cross-blade flexure element and the second/cross-blade flexure element.

3. The method of claim 1, wherein the blade angle is about 45 degrees.

4. The method of claim 1, wherein the first cross-blade flexure element and the second cross-blade flexure element have the same shape, except that the blade angle of the first cross-blade flexure element is +A, and the blade angle of the second cross-blade flexure element is −A, relative to the slot plane.

5. The method of claim 1, wherein the flexure material is a titanium alloy.

6. The method of claim 1, wherein the step of machining a first cross-blade flexure element includes the step of
   machining the first cross-blade flexure element by electrical discharge machining.

7. The method of claim I, wherein the step of machining a first cross-blade flexure element includes the step of
   machining the first cross-blade flexure element by water-jet machining.

8. A method of fabricating a cross-blade flexure block, comprising the steps of:
   furnishing a first plate of a flexure material;
   machining a first cross-blade flexure element from the first plate as a first single piece of material having no braze joints therein;
   furnishing a second plate of the flexure material;
   machining a second cross-blade flexure element from the second plate as a second single piece of material having no braze joints therein,
   the first cross-blade flexure element including a first blade having an angle +A relative to a slot plane between the first cross-blade flexure element and the second cross-blade flexure element, and
   the second cross-blade flexure including a second blade having an angle −A relative to the slot plane; and
   assembling the first cross-blade flexure element and the second cross-blade flexure element together to form a flexure block using locating pins extending between the first cross-blade flexure element and the second cross-blade flexure element.

9. The method of claim 8, wherein the step of machining a first cross-blade blade flexure element includes the step of machining the first cross-blade flexure element by water jet machining.

10. The method of claim 8, wherein each of the cross-blade flexure elements comprises an upper blade housing, a lower blade housing positioned with respect to the upper blade housing such that there is a planar slot between the upper blade housing and the lower blade housing and lying in a slot plane, the upper blade housing and the lower blade housing being shaped to define an external form factor symmetric about a housing axis and a bore therethrough symmetric about the housing axis, and a blade extending through the bore between the upper housing and the lower housing and intercepting the housing-axis, the blade having the blade angle relative to the slot plane.

11. The method of claim 10, wherein the blade angle is about 45 degrees.

12. The method of claim 8, wherein the first cross-blade flexure element and the second cross-blade flexure element have the same shape, except that the blade angle of the first cross-blade flexure element is +A, and the blade angle of the second cross-blade flexure element is −A, relative to the slot plane.

13. The method of claim 8, wherein the flexure material is a titanium alloy.

14. The method of claim 8, wherein the step of machining a first cross-blade flexure element includes the step of machining the first cross-blade flexure element by electrical discharge machining.

* * * * *